US010502453B2

(12) United States Patent
Se et al.

(10) Patent No.: US 10,502,453 B2
(45) Date of Patent: Dec. 10, 2019

(54) BURNER CASE PRODUCTION METHOD AND BURNER CASE

(71) Applicant: NORITZ CORPORATION, Hyogo (JP)

(72) Inventors: Naoki Se, Kobe (JP); Michihisa Nakahara, Kobe (JP); Hideyuki Fujisawa, Kobe (JP); Kenichi Sakurai, Kobe (JP); Taihei Terasawa, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 178 days.

(21) Appl. No.: 15/683,272

(22) Filed: Aug. 22, 2017

(65) Prior Publication Data
US 2018/0058719 A1   Mar. 1, 2018

(30) Foreign Application Priority Data
Aug. 26, 2016   (JP) .................................. 2016-165258

(51) Int. Cl.
| | | |
|---|---|---|
| *B23P 19/04* | (2006.01) | |
| *F24H 9/02* | (2006.01) | |
| *F24H 9/18* | (2006.01) | |
| *B21D 51/16* | (2006.01) | |
| *B21D 51/24* | (2006.01) | |

(52) U.S. Cl.
CPC ............... *F24H 9/02* (2013.01); *B21D 51/16* (2013.01); *B21D 51/24* (2013.01); *B23P 19/04* (2013.01); *F24H 9/1836* (2013.01)

(58) Field of Classification Search
CPC ....................................................... F24H 9/02

USPC ......................................... 122/17.1; 431/154
See application file for complete search history.

(56) References Cited

U.S. PATENT DOCUMENTS

| | | | | |
|---|---|---|---|---|
| 1,919,285 | A * | 7/1933 | Wetherbee | F23D 14/125 110/262 |
| 2,197,619 | A * | 4/1940 | Mueller | F23C 99/00 110/309 |
| 2,647,657 | A * | 8/1953 | Krupp | B65D 90/38 220/530 |
| 2,975,092 | A * | 3/1961 | Hagerty | B65D 9/34 156/212 |
| 3,173,354 | A * | 3/1965 | Kinkead et al. | F23L 17/02 454/3 |
| 3,439,463 | A * | 4/1969 | Matarese | E04B 1/6803 52/278 |

(Continued)

FOREIGN PATENT DOCUMENTS

JP   2013-242080 A   12/2013

*Primary Examiner* — Avinash A Savani
(74) *Attorney, Agent, or Firm* — Studebaker & Brackett PC

(57) ABSTRACT

The burner case has a first member having a caulking portion and a second member having a facing portion facing the caulking portion and an extending portion for caulking, the extending portion extending from the facing portion, the caulking portion being held between the facing portion and the extending portion by bending the extending portion. A part of the extending portion in longitudinal direction constitutes a claw portion. Thus, the first member and the second member are not required to be screwed or the number of screws is reduced, thereby improving productivity of the burner case and reducing the production cost of the burner case.

12 Claims, 6 Drawing Sheets

(56) References Cited

U.S. PATENT DOCUMENTS 4,040,166 A * 8/1977 Morphy ................ F25D 23/064
220/592.1

* cited by examiner

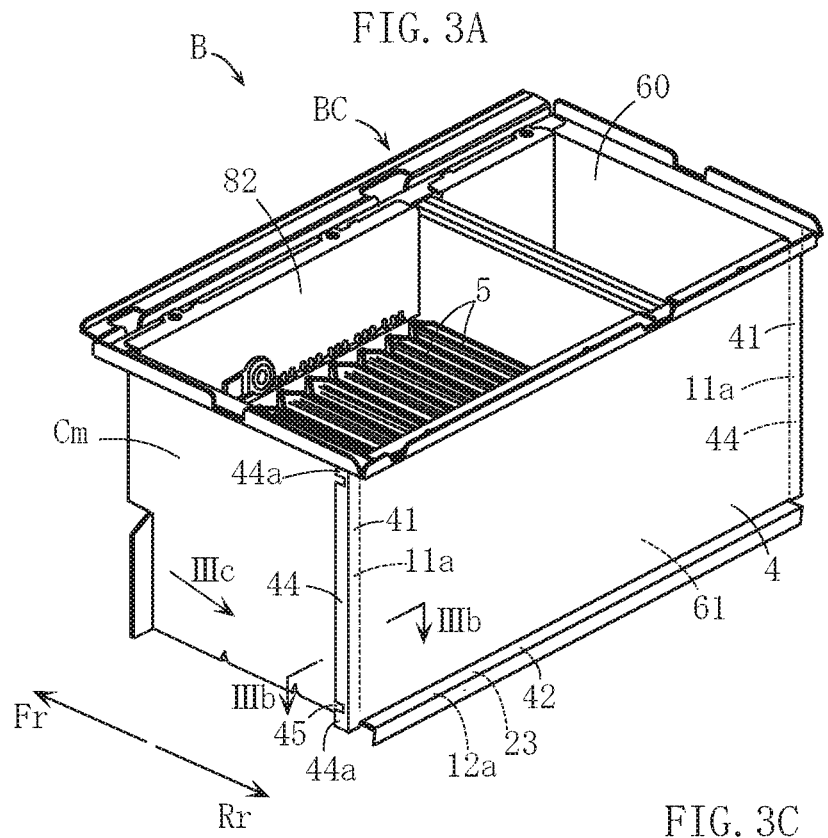
FIG. 3A
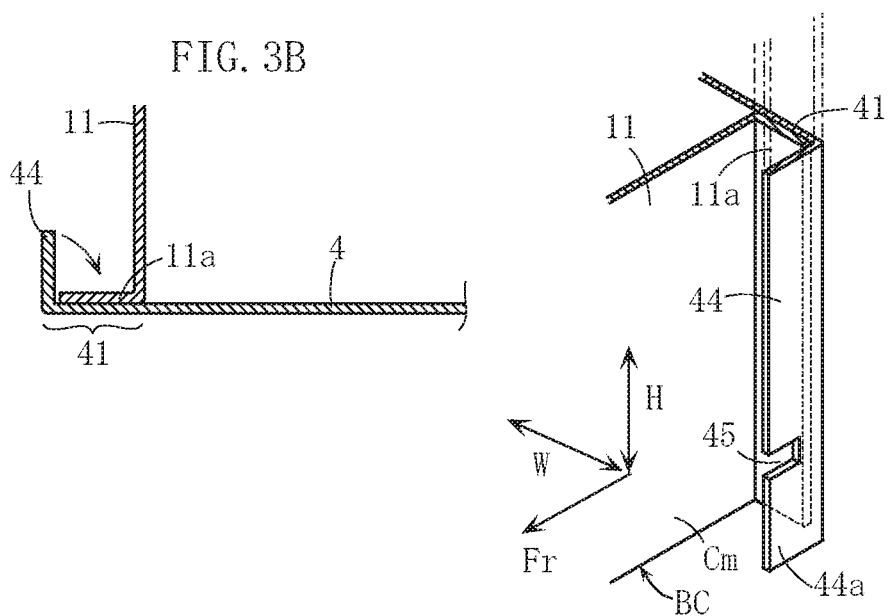
FIG. 3B
FIG. 3C

BURNER CASE PRODUCTION METHOD AND BURNER CASE

BACKGROUND OF THE INVENTION

Field of the Invention

The present invention relates to a technology in a burner case to be used as a constitutional element of a combustion device of an instantaneous water heating apparatus.

Description of the Related Art

One embodiment of a combustion device of an instantaneous water heating apparatus is disclosed in Patent Literature 1.

The combustion device disclosed in Patent Literature 1 houses a burner in a burner case. The burner case is configured by combining a case main body and a cover portion, the case main body having a rear opening in addition to an upper opening, the cover portion closing the rear opening, as illustrated in FIG. 3 and FIG. 4. The rear opening is used for incorporating the burner into the case main body.

When the burner case mentioned above is produced, conventionally the case main body and the cover portion are fixed by screwing the cover portion to the case main body with a plurality of screws.

However, in such a fixing means, the screwing operation is complicated and the productivity is not so good. In addition, gas in the burner case is required not to leak outside, so that a sealing packing is required to be interposed between the cover portion and the case main body in case of the screwing operation, thereby increasing the production cost.

The inventors of the present invention have conceived that a caulking means is used for fixing the cover portion to the case main body instead of a screwing means. For producing the burner case, the cover portion is required to be fixed to the case main body after the burner is incorporated into the case main body. Therefore, the posture, i.e., the direction, of the burner case is sometimes required to be changed in accordance with the specification of a caulking device depending on the case when the burner is incorporated into the case main body or when caulking operation is executed with the caulking device. For example, when the burner is incorporated into the case main body, the case main body stands up and the cover portion is incorporated from the back of the case main body. On the other hand, at the time of caulking with the caulking device, the cover portion is sometimes required to be positioned under the case main body. When the posture of the burner case is changed as mentioned above, the case main body and the cover portion are misaligned inappropriately if any countermeasures are not provided. In order to prevent such a positional misalignment, the case main body and the cover portion can be screwed with a few screws for temporary fixing. If such a measure is adopted, screwing operation is complicated and it is hard to sufficiently reduce the production cost.

CITATION LIST

Patent Literature 1: Japanese Unexamined Patent Application Publication No. 2013-242080, referring to FIG. 1 to FIG. 4.

SUMMARY OF THE INVENTION

The present invention is proposed in view of the above-mentioned disadvantages and has an object to provide a burner case production method and a burner case that achieve high production efficiency and reduction of the production cost.

In order to solve the above-mentioned problems, the present invention proposes the following technical means.

A burner case production method proposed in the first aspect of the present invention includes a temporary fixing procedure to temporarily fix a first member and a second member after the first member and the second member are combined, the first member and the second member constituting the burner case; and a main fixing procedure to actually fix the first member and the second member after the temporary fixing procedure. The second member has a facing portion facing a caulking portion of the first member and an extending portion extending from the facing portion, a part of the extending portion in longitudinal direction constituting a claw portion. In the temporary fixing procedure, a temporary caulking operation is executed in such a manner that the claw portion is bent and the caulking portion is held between the claw portion and the facing portion. In the main fixing procedure, a main caulking operation is executed in such a manner that the extending portion excluding the claw portion is also bent and the caulking portion is held between the extending portion and the facing portion.

Preferably, the claw portion of the extending portion is sectioned by a cutout concave portion extending inward from an outer edge of the extending portion in width direction.

Preferably, the cutout concave portion is positioned adjacent to an end portion of the extending portion in longitudinal direction, and an area closer to the end portion further than the cutout concave portion constitutes the claw portion.

Preferably, dimension of the cutout concave portion in width direction is equal to or less than overlapping width of the extending portion and the caulking portion.

Preferably, the claw portion is a partially widened region of the extending portion.

Preferably, the burner case has a case main body having an opening and housing a burner and has a cover portion to be attached to the case main body so as to close the opening. One of the case main body and the cover portion is the first member and the other is the second member.

Preferably, the opening of the case main body has a pair of flange portions extending in vertical height direction on both right and left sides, and both edge portions of the cover portion in width direction are areas respectively facing the pair of flange portions when the case main body is provided in such a manner that the opening faces in horizontal direction. Either of the pair of flange portions and both edge portions is the caulking portion and the other is the facing portion.

Preferably, the burner case production method further includes a caulking procedure after the temporary fixing procedure, wherein a lower edge portion of the opening of the case main body and a lower edge portion of the cover portion are connected by caulking.

A burner case proposed in the second aspect of the present invention has a first member having a caulking portion, and a second member having a facing portion facing the caulking portion and an extending portion for caulking, the extending portion extending from the facing portion, the caulking portion being held between the facing portion and the extending portion by bending the extending portion. A part of the extending portion in longitudinal direction constitutes a claw portion.

The other characteristics and advantages of the present invention are apparent from the following explanation of the preferred embodiments referring to the attached drawings.

BRIEF DESCRIPTION OF THE DRAWINGS

FIG. 3A is a perspective view illustrating that the cover portion is incorporated (not fixed) into the case main body illustrated in FIG. 2A, FIG. 3B is a sectional view taken along the line IIIb to IIIb in FIG. 3A, and FIG. 3C is a partially broken perspective view of an essential part taken along the arrow IIIc in FIG. 3A.

DETAILED DESCRIPTION OF THE PREFERRED EMBODIMENT

Preferred embodiments of the present invention are explained below with reference to the accompanying drawings.

In the figures, the arrow Fr indicates the forward direction, the arrow Rr indicates the rearward direction, the arrow W indicates the width direction, and the arrow H indicates the vertical height direction.

A burner case BC illustrated in FIG. 1A to FIG. 1D is approximately in the shape of a cuboid having an upper opening and constitutes a combustion device B by being combined with a plurality of burners 5 housed in the burner case BC. The combustion device B is, for example, used as a constitutional element of a water heating apparatus and supplies combustion gas generated by the burners 5 to a heat exchanger for heating water. The burners 5 are configured similar to those disclosed in Patent Literature 1. The burner case BC houses a pair of shield plates 82, referring to FIG. 2A, to prevent a side wall of the burner case BC from being heated to a high temperature, and a partition plate 83 to partition the burner case BC into two combustion chambers.

Figure 2A:
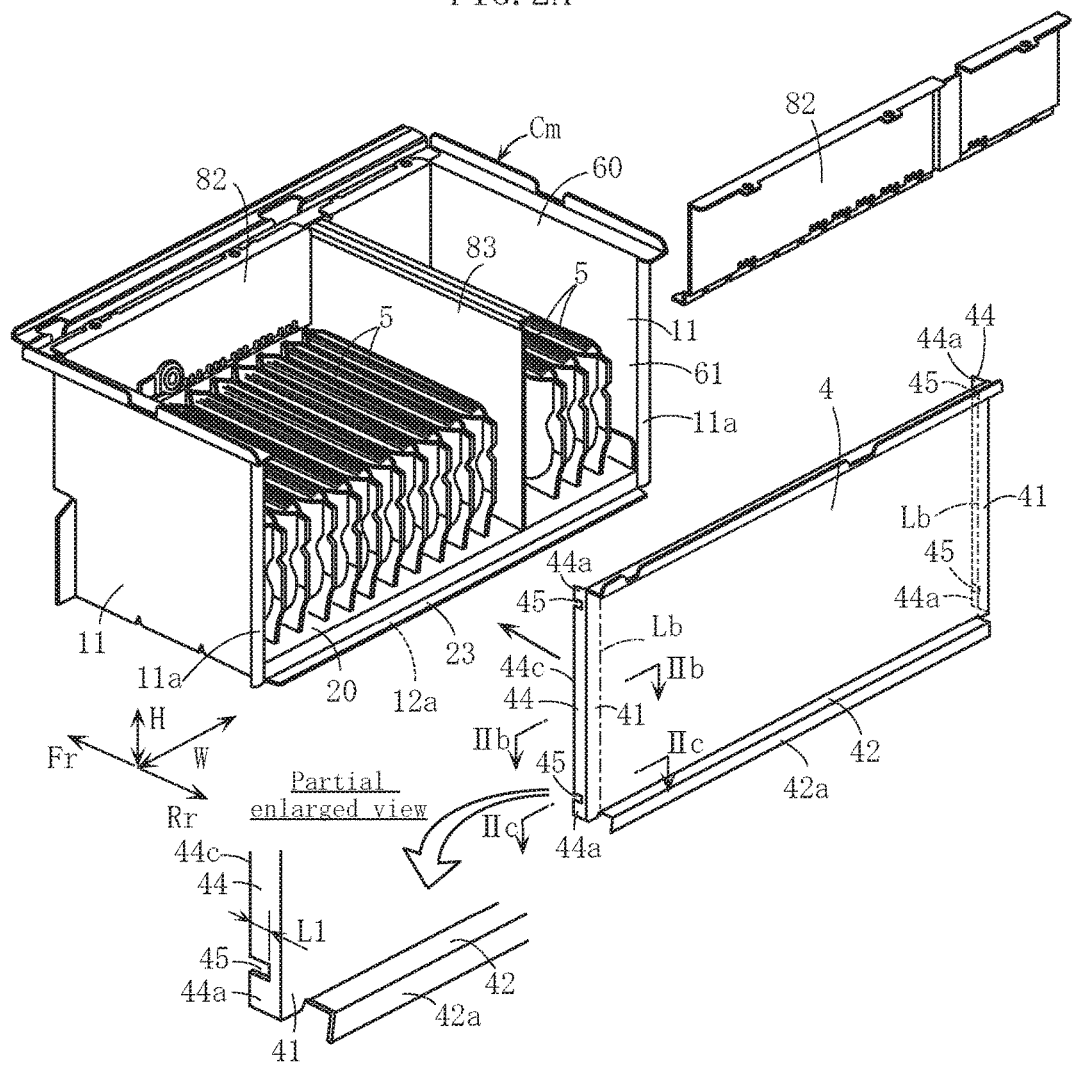
FIG. 2A is a perspective view illustrating a case main body and a cover portion before the burner case in FIG. 1A is incorporated.

The burner case BC is configured by combining a case main body Cm and a cover portion 4. As illustrated in FIG. 2A, the case main body Cm has a rear opening 61 facing in the horizontal direction as an opening in addition to an upper opening 60. The upper opening 60 is a region to upwardly feed combustion gas generated by the burners 5, on the other hand, the rear opening 61 is a region for an incorporating operation of the burners 5 into the case main body Cm. The rear opening 61 is an opening to be closed by the cover portion 4 and is one example of an opening of the case main body in the present invention.

Figure 5:
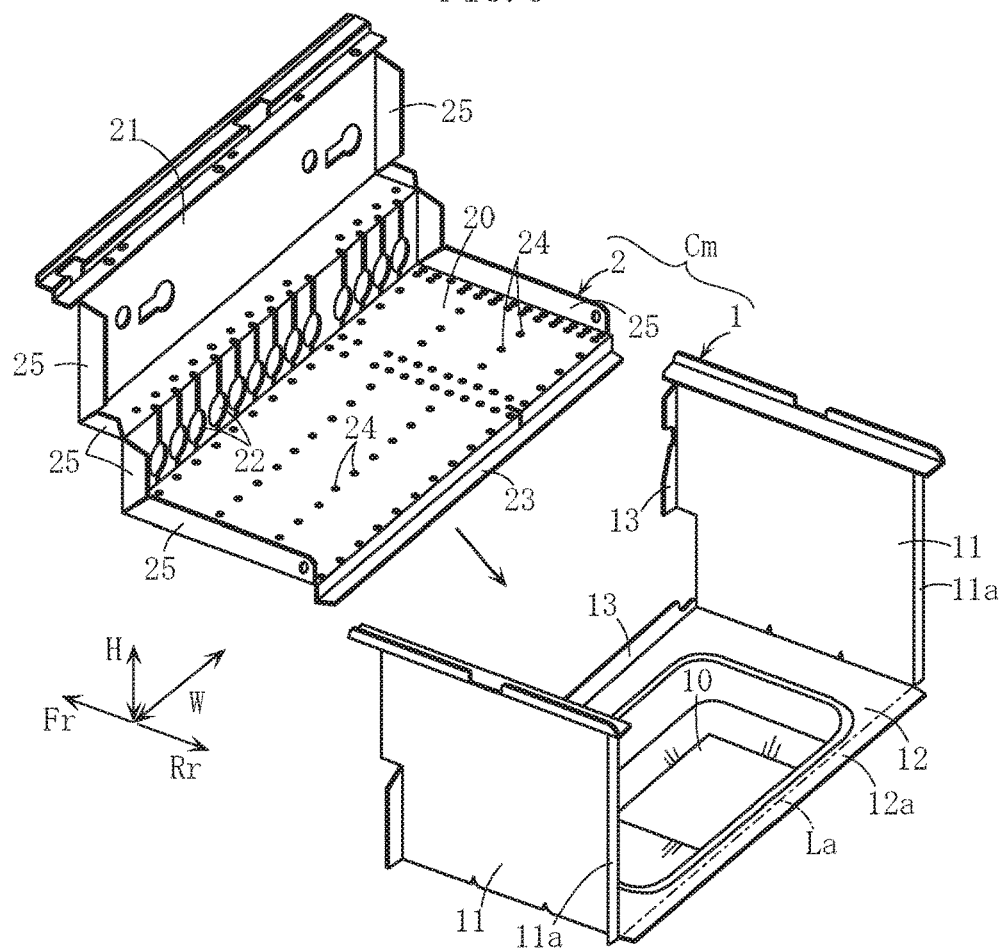
FIG. 5 is an exploded perspective view of the case main body illustrated in FIG. 2A.

As illustrated in FIG. 5, the case main body Cm is configured by combining a base member 1 and a burner set member 2, both are formed by pressing metal plates. The case main body in the present invention can be constituted with a single member. The base member 1 has a bottom wall portion 12 and a pair of side wall portions 11 rising upward from both end portions of the bottom wall portion 12 in the width direction. The bottom wall portion 12 has a hole 10 for passing through combustion air discharged from a fan, not illustrated in the figures. The burner set member 2 has a current plate portion 20 having a plurality of small vent holes 24, a front wall portion 21 rising upward from a front side edge portion of the current plate portion 20, and a plurality of openings 22 to supply fuel gas to the burner 5. The case main body Cm is assembled in such a manner that the current plate portion 20 is overlapped on the upper side of the bottom wall portion 12, and the front wall portion 21 is interposed between the pair of side wall portions 11. The base member 1 and the burner set member 2 are positioned by means of flange portions 13, 25 provided therefore, and are caulked by TOX or welded, thereby being assembled.

As illustrated in FIG. 1A to FIG. 1D, the fixing means of the burner case BC for incorporating the cover portion 4 into the case main body Cm includes a pair of first caulked portion 7A in which both right and left edge portions of the cover portion 4 are connected by caulking to the case main body Cm and a second caulked portion 7B in which a lower edge portion of the cover portion 4 is connected by caulking to a lower edge portion of the case main body Cm.

Figure 2B:
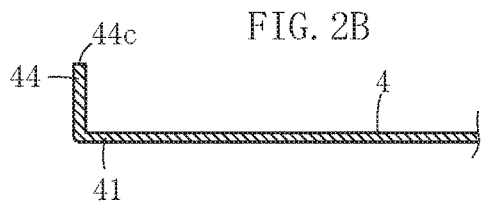
FIG. 2B is a sectional view taken along the line IIb to IIb in FIG. 2A.
Figure 2C:
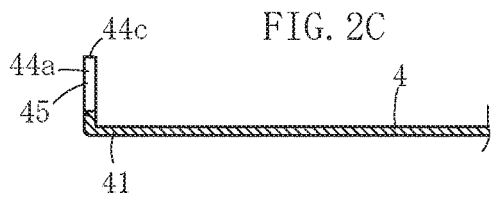
FIG. 2C is a sectional view taken along the line IIc to IIc in FIG. 2A.

The first caulked portion 7A is explained herein after. As apparently illustrated in FIG. 2A to FIG. 2C, rear end edges of the pair of side wall portions 11 of the case main body Cm are provided with a pair of flange portions 11a extending in the vertical height direction. The flange portion 11a is one example of a caulking portion in the present invention. On the other hand, the cover portion 4 is a rising plate and both right and left edge portions of the cover portion 4 include a pair of facing portions 41 facing the flange portions 11a, i.e., an outer end side portion in the width direction further than the virtual line Lb extending in the vertical height direction in FIG. 2A. A pair of extending portions 44 extend from outer edges of the facing portions 41 in an integrally connected manner, the extending portions 44 being bent so as to project forward from the outer edges.

Figure 1A:
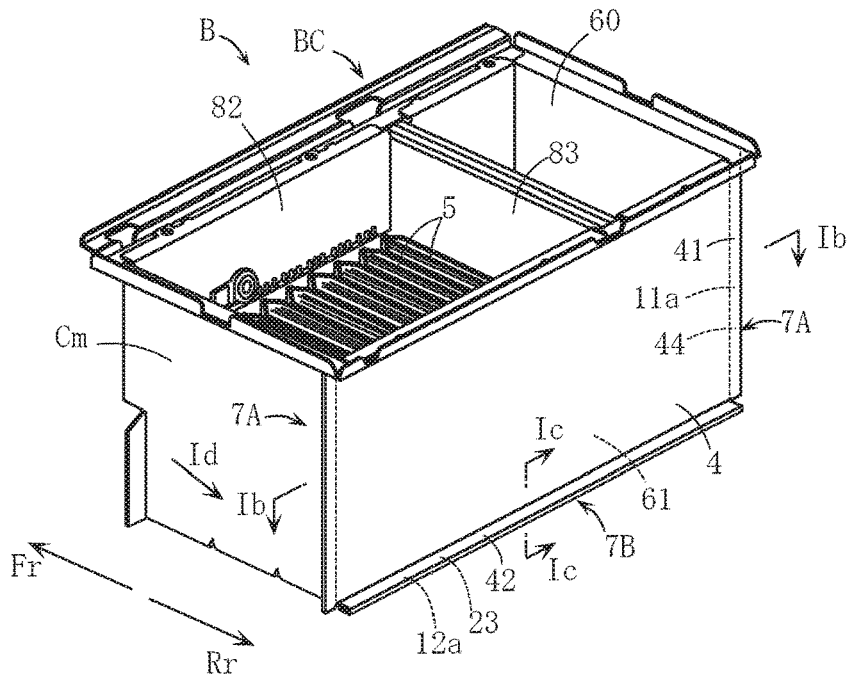
FIG. 1A is a perspective view of one embodiment of a burner case of the present invention.
Figure 1B:
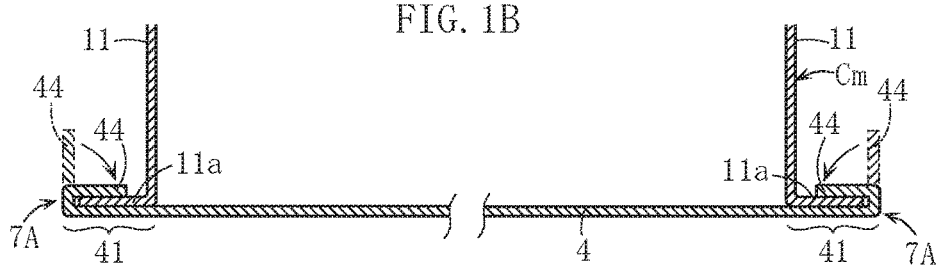
FIG. 1B is a sectional view taken along the line Ib to Ib in FIG. 1A.

As illustrated in FIG. 1B, in the first caulked portion 7A, the flange portion 11a and the facing portion 41 face and contact each other, and the extending portion 44 is bent so as to wind around the back side of the flange portion 11a. Thus, the flange portion 11a is strongly held and fixed between the extending portion 44 and the facing portion 41. In FIG. 2A, the extending portion 44 has a plurality of cutout concave portions 45 and a claw portion 44a for temporary caulking, to be mentioned later.

The second caulked portion 7B is explained hereinafter. As illustrated in FIG. 2A, the cover portion 4 has a flange portion 42 bent so as to project rearward from the lower edge portion of the cover portion 4 and an extending portion 42a for caulking bent downward from a tip end of the flange portion 42. On the other hand, the bottom wall portion 12 of the case main body Cm includes a rear end edge portion 12a projecting rearward further than the pair of side wall portions 11, i.e., a tip end side region of the bottom wall portion 12 further than a virtual line La extending in the width direction in FIG. 5. A rear end edge portion 23 of the current plate portion 20 is overlapped on the rear end edge portion 12a.

Figure 1C:
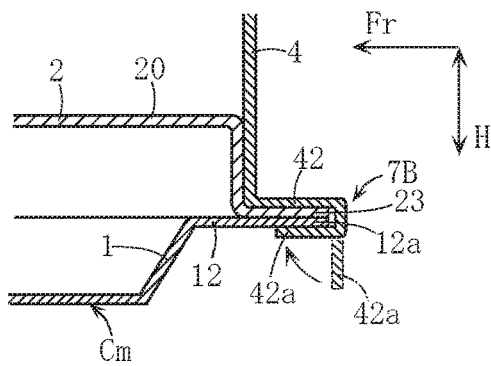
FIG. 1C is a sectional view taken along the line Ic to Ic in FIG. 1A.

As illustrated in FIG. 1C, in the second caulked portion 7B, the rear end edge portions 12a, 23 and the flange portion 42 are overlapped in the vertical height direction, and the extending portion 42a is bent so as to wind around a lower face side of the rear end edge portion 12a. Thus, the rear end edge portions 12a, 23 are strongly held and fixed between the extending portion 42a and the flange portion 42.

Next, one example of a production method of the above-mentioned burner case BC is explained.

Before the cover portion 4 is incorporated into the case main body Cm, the cover portion 4 is configured as illustrated in FIG. 2A. Specifically, each extending portion 44 has a pair of cutout concave portions 45 that are arranged vertically in the vicinity of the both vertical end portions, and the claw portion 44a for temporary caulking is formed in advance, wherein the vertical height direction of the extending portion 44 corresponds to one example of the longitudinal direction of the extending portion in the present invention. The cutout concave portion 45 is configured so as to extend from an outer edge 44c of the extending portion 44 in the width direction to the inside thereof. Thus, an upper end portion of the extending portion 44, namely an upper side area further than the upper cutout concave portion 45, and a lower end portion of the extending portion 44, namely a lower side area further than the lower cutout concave portion 45, are short claw portions 44a for temporary caulking.

Each cutout concave portion 45 is a concave portion having a predetermined width in the vertical height direction, as illustrated in the figures. Alternately, the cutout concave portion 45 can be in the form of a narrow slit, in the form of breach of which vertical width is almost zero, or approximately in the form of the letter V of which open width increases toward the outer edge 44c of the extending portion 44. When the cutout concave portion 45 becomes longer, the claw portion 44a is easily and greatly bent in case of a temporary caulking operation to be mentioned later. Preferably, the length L1 of the cutout concave portion 45 is equal to or less than the overlapping width L2 of the extending portion 44 and the flange portion 11a after a main caulking operation, to be mentioned later (referring to FIG. 1D).

When the cover portion 4 is incorporated into the case main body Cm, as illustrated in FIG. 3A to FIG. 3C, the facing portion 41 of the cover portion 4 faces and contacts the flange portion 11a of the case main body Cm. In such a case, the cover portion 4 is aligned in such a manner that the flange portion 42 of the cover portion 4 overlaps the rear end edge portions 12a, 23 of the case main body Cm.

Figure 4A:
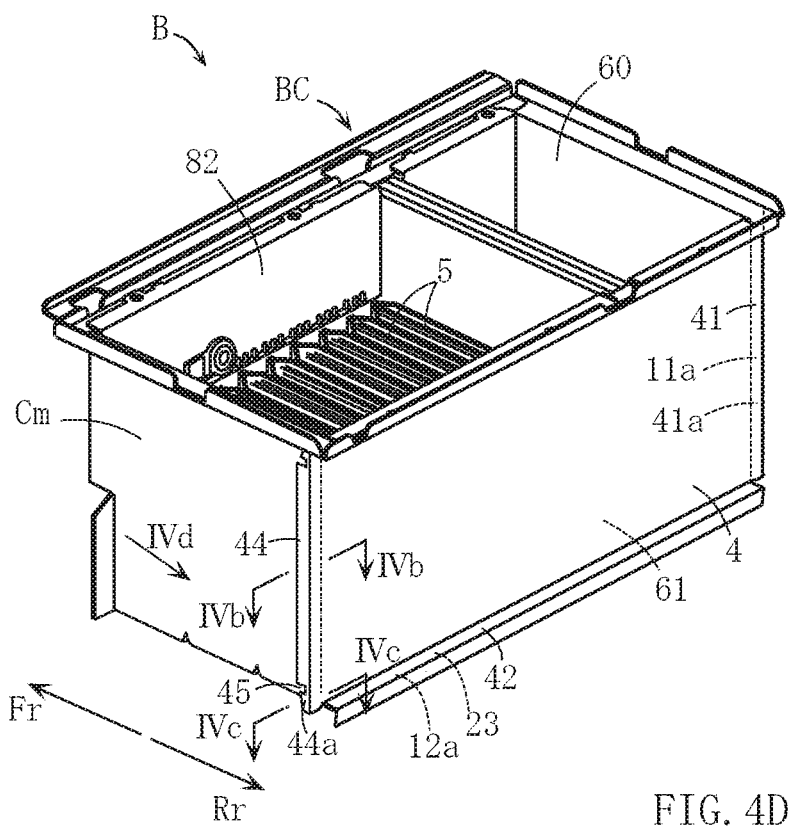
FIG. 4A is a perspective view illustrating that the cover portion is temporarily fixed to the case main body illustrated in FIG. 3A.
Figure 4B:
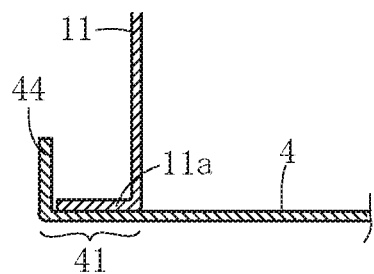
FIG. 4B is a sectional view taken along the line IVb to IVb in FIG. 4A.
Figure 4C:
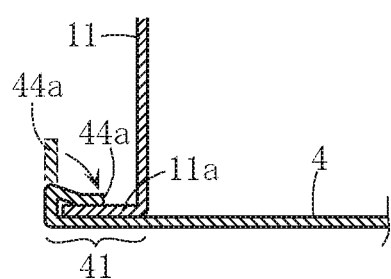
FIG. 4C is a sectional view taken along the line IVc to IVc in FIG. 4A.

Next, the case main body Cm and the cover portion 4 are temporarily fixed. The temporary fixing is executed by the temporary caulking operation as illustrated in FIG. 4A to FIG. 4D in such a manner that only the claw portion 44a of the extending portion 44 of the cover portion 4 is bent and the flange portion 11a is held between the claw portion 44a and the facing portion 41. The claw portion 44a is short in the vertical height direction, thereby being bent easily. Therefore, while the posture of the case main body Cm is kept as illustrated in FIG. 4A, the above-mentioned temporary caulking operation is appropriately executed using a caulking apparatus or device that is simply constituted and small sized. The posture of the case main body Cm illustrated in FIG. 4A is a posture when the burners 5 are incorporated into the case main body Cm.

Figure 4D:
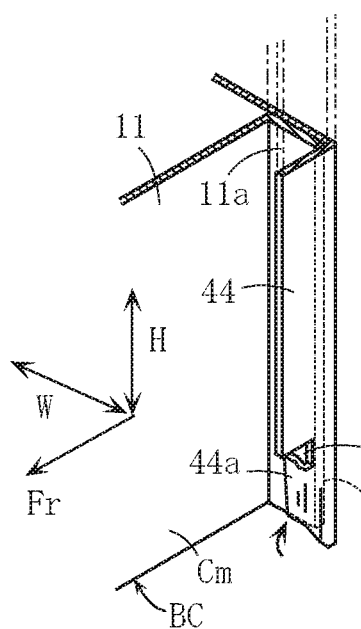
FIG. 4D is a partially broken perspective view of an essential part taken along the arrow IVd in FIG. 4A.

Each claw portion 44a is located at both vertical end portions of the extending portion 44, so that a part of the claw portions 44a located at the lower end portion of the extending portion 44 can be configured to contact the lower end portion of the flange portion 11a under pressure so as to be engaged as illustrated in FIG. 4D. Some claw portions 44a at the upper end portions of the extending portions 44 can be configured to contact the upper end portions of the flange portions 11a under pressure so as to be engaged in the same principle as above, not illustrated in the figures. In such a case, sure and strong temporary fixing of the case main body Cm and the cover portion 4 by temporary caulking is achieved.

After the above-mentioned temporary fixing, the main caulking operation to form the first caulked portion 7A is executed, as explained above referring to FIG. 1A to FIG. 2D, thereby achieving the main fixing of the case main body Cm and the cover portion 4. In addition, the caulking operation to form the second caulked portion 7B is also executed. Such a caulking operation is executed using a relatively large caulking apparatus different from that for the temporary caulking. The caulking apparatus is designed in such a manner that the cover portion 4 and the case main body Cm are set at a predetermined position in such a manner that the cover portion 4 is located under the case main body Cm. Therefore, for starting the above caulking operation, the posture of the case main body Cm and the cover portion 4 is required to be changed. Since the case main body Cm and the cover portion 4 are temporarily fixed by means of the claw portion 44a, so that the case main body Cm and the cover portion 4 are not misaligned when the posture is changed.

Figure 1D:
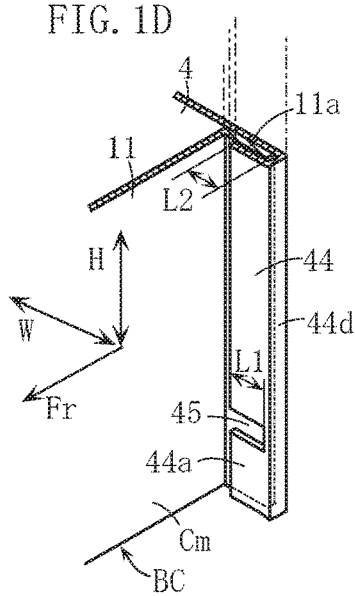
FIG. 1D is a partially broken perspective view of an essential part taken along the arrow Id in FIG. 1A.

In case of the main caulking operation to form the first caulked portion 7A, as illustrated in FIG. 1A to FIG. 1D, the extending portion 44 of the cover portion 4 is bent in the entire length area in the vertical height direction. Thus, the flange portion 11a is strongly held between the entire length areas of the extending portion 44 and the facing portion 41. In such a case, the claw portion 44a is also bent. Thus, as illustrated in FIG. 1D, almost the entire area of the claw portion 44a is able to contact the flange portion 11a under pressure. As illustrated in FIG. 1D, the length L1 of the cutout concave portion 45 is preferably equal to or less than the overlapping width L2 of the extending portion 44 and the flange portion 11a, so that the cutout concave portion 45 does not inhibit the airtightness of the burner case BC. In a bending process portion 44d of the extending portion 44, since the adhesiveness of the extending portion 44 and the flange portion 11a is apt to be lowered, gas in the burner case BC may leak outside through the cutout concave portion 45 when the cutout concave portion 45 is positioned at the bending process portion 44d. On the other hand, in the above-mentioned configuration, the entire cutout concave portion 45 is appropriately closed by the flange portion 11a and the above-mentioned fear is appropriately avoided.

As illustrated in FIG. 1C, the second caulked portion 7B is configured in such a manner that the extending portion 42a is bent and is wound around the lower face side of the rear end edge portions 12a, 23 of the case main body Cm. In the second caulked portion 7B, the case main body Cm and the cover portion 4 are fixed and further the base member 1 and the burner set member 2 of the case main body Cm are fixed and connected.

In accordance with the above-mentioned sequential operations, the burner case BC illustrated in FIG. 1A is appropriately produced.

In the embodiment of the present invention, the following advantageous effects are obtained. At first, the case main body Cm and the cover portion 4 are incorporated only by means of the caulking operation without using a screwing means, thereby achieving high productivity and low production cost.

Secondary, the first caulked portion 7A and the second caulked portion 7B have high airtightness. As a result, a sealing packing is not required to be interposed between the case main body Cm and the cover portion 4, thereby achieving low production cost.

Thirdly, the case main body Cm and the cover portion 4 are temporarily fixed before being caulked and connected (the main caulking), so that the case main body Cm and the cover portion 4 are not inappropriately misaligned at the time of the main caulking operation.

Fourthly, the case main body Cm and the cover portion 4 are temporarily fixed by the temporary caulking, so that screwing is not necessary or the number of the screws is reduced at the time of the temporary fixing, thereby achieving high productivity.

Fifthly, the case main body Cm and the cover portion 4 are temporarily fixed using the claw portion 44a that is a part of the extending portion 44 to be used for the main caulking, so that the region exclusive for the temporary caulking is not required to be provided in addition to the extending portion 44. Therefore, complicated configuration of the case main body Cm and the cover portion 4 is inhibited.

Sixthly, the claw portion 44a to be bent in the temporary caulking operation is configured to be easily bent. Therefore, the temporary caulking operation is easily and appropriately executed.

Figure 6:
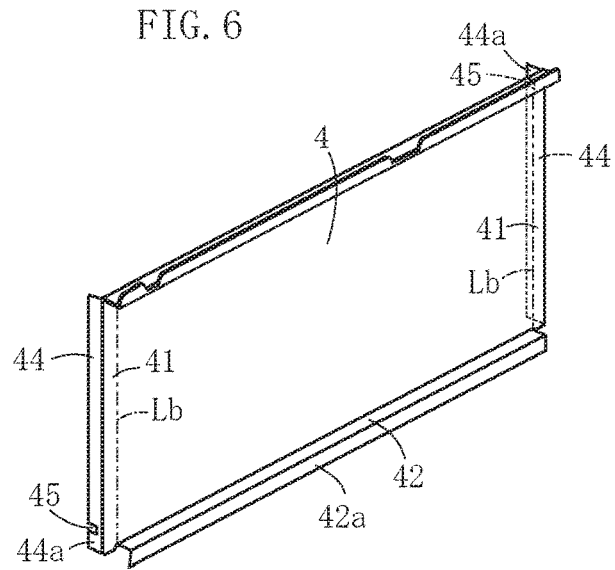
FIG. 6 is a perspective view illustrating another embodiment of the present invention.
Figure 7:
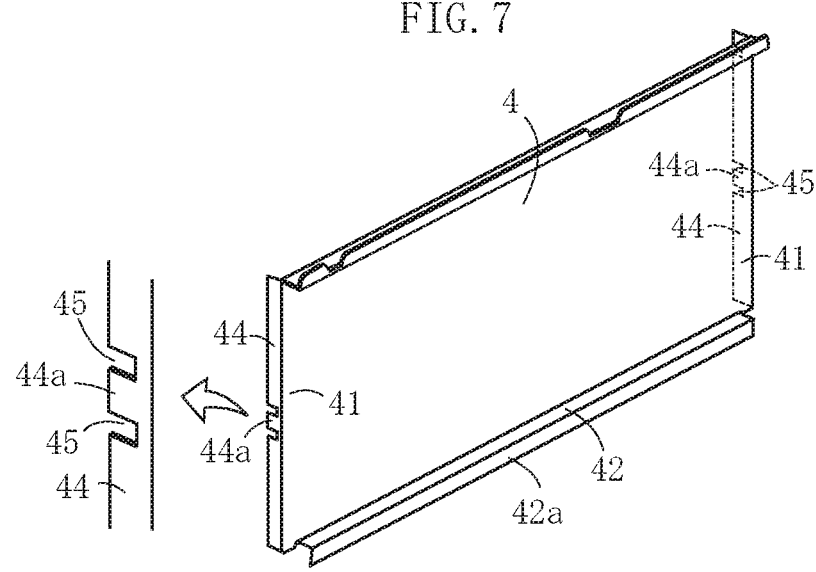
FIG. 7 is a perspective view illustrating another embodiment of the present invention.
Figure 8:
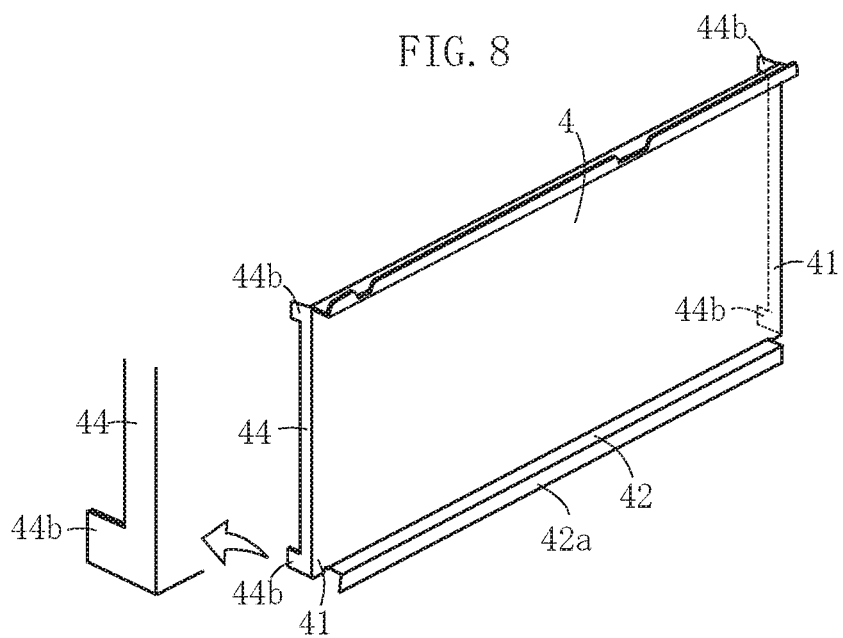
FIG. 8 is a perspective view illustrating another embodiment of the present invention.

FIG. 6 to FIG. 8 illustrate another embodiment of the present invention. In these figures, the same or similar elements are allotted with the same reference numerals mentioned above and their explanation is omitted here.

In the embodiment illustrated in FIG. 6, the claw portion 44a is provided on an upper end portion of one of the pair of extending portions 44 of the cover portion 4, and the claw portion 44a is provided on a lower end portion of the other extending portion 44. Thus, the total number of the claw portions 44a is reduced and the cover portion 4 is temporarily fixed to the case main body Cm in a safe manner. In the previously mentioned embodiment, as illustrated in FIG. 2A, although four claw portions 44a are provided for the cover portion 4, the temporary caulking operation does not require all of four claw portions 44a. Like the arrangement of the claw portions 44a illustrated in FIG. 6, only two of four claw portion 44a can be used for the temporary caulking.

As understood from this embodiment and the previous embodiment, the present invention does not limit the number of the claw portions 44a provided for the extending portion 44 and the number of the claw portions 44a to be practically used for the temporary caulking.

In the embodiment illustrated in FIG. 7, two cutout concave portions 45 are provided in the middle area in the vertical height direction (longitudinal direction) of the extending portion 44 of the cover portion 4 and the area between two cutout concave portions 45 constitutes the claw portion 44a.

In such a configuration, the claw portion 44a is short in the vertical height direction, so that the claw portion 44a is easily bent and is used for the temporary caulking. When the claw portion 44a is provided at the end portion of the extending portion 44 in the longitudinal direction, only one cutout concave portion 45 is required. When the claw portion 44a is provided in the middle of the extending portion 44 in the longitudinal direction, the number of the cutout concave portions 45 increases. The claw portion 44a is easily bent when the claw portion 44a is positioned at the end portion of the extending portion 44. Therefore, the claw portion 44a is preferably provided at the end portion of the extending portion 44 in the longitudinal direction.

In the embodiment illustrated in FIG. 8, both upper and lower end portions of the extending portion 44 are partially wide, namely wider than other portion of the extending portion 44, and constitute a claw portion 44b.

In such a configuration, the claw portion 44b is wide, so that the claw portion 44b is easily and greatly bent and is used for the temporary caulking. The claw portion mentioned in the specification of the present invention includes such a wide claw portion. The wide claw portion 44b can be provided in the middle of the extending portion 44 in the longitudinal direction, not illustrated in the figures.

The present invention is not limited to the above-mentioned embodiments. The concrete configuration of each procedure of the production method of the burner case in the present invention is variable within the intended scope of the present invention. In addition, the concrete configuration of the burner case of the present invention is freely designed In the above mentioned embodiments, the flange portion 11a of the case main body Cm constitutes the caulking portion and both right and left edge portions of the cover portion 4 constitute the facing portions 41. Alternatively, in the present invention, both right and left edge portions of the cover portion 4 can constitute the caulking portion, the flange portion 11a can constitute the facing portion, and the extending portion for caulking can extend from the flange portion 11a.

In the above mentioned embodiments, the second caulked portion 7B is provided in addition to the first caulked portion 7A for incorporating and fixing the cover portion 4 to the case main body Cm. For example, the fixing means cannot have the second caulked portion 7B. In such a case, the lower edge portions of the cover portion 4 and the case main body Cm can be fastened with a screw. Even in such a case, the number of the screws is reduced when the first caulked portion 7A is provided. It is advantageous that the production cost is reduced compared with the related art.

The claw portion in the present invention is a claw-like portion capable of temporarily caulking by partially bending a part of the extending portion, and the specific configuration of the claw portion is not limited to those mentioned in the above embodiments. The first and the second members in the present invention are not limited to the case main body Cm and the cover portion 4. The present invention is widely applicable to connect and fix two members constituting the burner case. For example, when one of the base member 1 and the burner set member 2 illustrated in FIG. 5 can be the first member, the other can be the second member, and the present invention can be applied to connect and fix the first and the second members. The burner case is not limited to be used for a water heating apparatus. The specific type and configuration of the burner housed in the burner case are not limited.

The invention claimed is:
1. A burner case production method, comprising:
a temporary fixing procedure to temporarily fix a first member and a second member after the first member and the second member are combined, the first member and the second member constituting the burner case; and a main fixing procedure to actually fix the first member and the second member after the temporary fixing procedure, wherein the second member has a facing portion facing a caulking portion of the first member and an extending portion extending from the facing portion, a part of the extending portion in longitudinal direction constituting a claw portion, in the temporary fixing procedure a temporary caulking operation is executed in such a manner that the claw portion is bent and the caulking portion is held between the claw portion and the facing portion, in the main fixing procedure a main caulking operation is executed in such a manner that the extending portion excluding the claw portion is also bent and the caulking portion is held between the extending portion and the facing portion, and the claw portion of the extending portion is sectioned from the extending portion by a cutout concave portion extending inward from an outer edge of the extending portion in width direction.

2. The burner case production method according to claim 1, wherein the cutout concave portion is positioned adjacent to an end portion of the extending portion in longitudinal direction, and an area closer to the end portion further than the cutout concave portion constitutes the claw portion.

3. The burner case production method according to claim 1, wherein dimension of the cutout concave portion in width direction is equal to or less than overlapping width of the extending portion and the caulking portion.

4. The burner case production method according to claim 1, wherein the claw portion is a partially widened region of the extending portion.

5. The burner case production method according to claim 1, wherein the burner case has a case main body having an opening and housing a burner and has a cover portion to be attached to the case main body so as to close the opening, and one of the case main body and the cover portion is the first member and the other is the second member.

6. The burner case production method according to claim 5, wherein the opening of the case main body has a pair of flange portions extending in vertical height direction on both right and left sides, and both edge portions of the cover portion in width direction are areas respectively facing the pair of flange portions when the case main body is positioned in such a manner that the opening faces in horizontal direction, and either of the pair of flange portions and both edge portions is the caulking portion and the other is the facing portion.

7. The burner case production method according to claim 6, the method further comprising a caulking procedure after the temporary fixing procedure, wherein a lower edge portion of the opening of the case main body and a lower edge portion of the cover portion are connected by caulking.

8. A burner case, comprising:

a first member having a caulking portion; and a second member having a facing portion facing the caulking portion and an extending portion for caulking, the extending portion extending from the facing portion, the caulking portion being held between the facing portion and the extending portion by bending the extending portion, wherein a part of the extending portion in longitudinal direction constitutes a claw portion, and the claw portion of the extending portion is sectioned from the extending portion by a cutout concave portion extending inward from an outer edge of the extending portion in width direction.

9. The burner case according to claim 8, wherein the cutout concave portion is positioned adjacent to an end portion of the extending portion in longitudinal direction, and an area closer to the end portion further than the cutout concave portion constitutes the claw portion.

10. The burner case according to claim 8, wherein dimension of the cutout concave portion in width direction is equal to or less than overlapping width of the extending portion and the caulking portion.

11. The burner case according to claim 8, wherein the claw portion is a partially widened region of the extending portion.

12. The burner case according to claim 8, comprising a case main body having an opening and housing a burner and a cover portion to be attached to the case main body so as to close the opening, wherein one of the case main body and the cover portion is the first member and the other is the second member.

* * * * *